United States Patent
Lunttila et al.

(10) Patent No.: US 11,463,943 B2
(45) Date of Patent: Oct. 4, 2022

(54) TRANSMISSION OF DISCOVERY REFERENCE SIGNALS ON UNLICENSED CARRIER IN A WIRELESS NETWORK

(71) Applicant: Nokia Solutions and Networks Oy, Espoo (FI)

(72) Inventors: Timo Erkki Lunttila, Espoo (FI); Esa Tapani Tiirola, Kempele (FI); Klaus Hugl, Vienna (AT)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/525,122

(22) PCT Filed: Oct. 28, 2015

(86) PCT No.: PCT/EP2015/074977
§ 371 (c)(1),
(2) Date: May 8, 2017

(87) PCT Pub. No.: WO2016/071176
PCT Pub. Date: May 12, 2016

(65) Prior Publication Data
US 2018/0279211 A1    Sep. 27, 2018

Related U.S. Application Data

(60) Provisional application No. 62/077,141, filed on Nov. 7, 2014.

(51) Int. Cl.
*H04W 48/16* (2009.01)
*H04W 72/04* (2009.01)
(Continued)

(52) U.S. Cl.
CPC .......... *H04W 48/16* (2013.01); *H04L 1/1854* (2013.01); *H04L 1/1887* (2013.01);
(Continued)

(58) Field of Classification Search
None
See application file for complete search history.

(56) References Cited

U.S. PATENT DOCUMENTS

2008/0084330 A1* 4/2008 Picard ............... H04B 17/318
340/870.02
2012/0250520 A1* 10/2012 Chen ....................... H04L 5/001
370/241
(Continued)

FOREIGN PATENT DOCUMENTS

| EP | 2 753 124 A1 | 7/2014 |
| JP | 2014143218 | * 8/2014 |

(Continued)

OTHER PUBLICATIONS

U.S. Appl. No. 62/016,001, Han (Year: 2014).*

*Primary Examiner* — Andre Tacdiran
(74) *Attorney, Agent, or Firm* — Joseph C. Drish; Harrington & Smith

(57) ABSTRACT

An example technique may include transmitting, by a base station via a component carrier in a licensed band, control information including a resource allocation that identifies time-frequency resources for periodical transmission opportunities to be used for the conditional transmission of discovery reference signals via a secondary component carrier in an unlicensed band, determining, prior to each transmission opportunity, whether the secondary component carrier in the unlicensed band is unoccupied, and transmitting, if the secondary component carrier in the unlicensed band is unoccupied, the discovery reference signals via the secondary component carrier in the unlicensed band using the identified time-frequency resources to one or more user devices.

18 Claims, 7 Drawing Sheets

(51) Int. Cl.
*H04L 1/18* (2006.01)
*H04L 5/00* (2006.01)
*H04W 56/00* (2009.01)
*H04W 74/08* (2009.01)
*H04W 16/14* (2009.01)

(52) U.S. Cl.
CPC ......... *H04L 5/0048* (2013.01); *H04W 56/001* (2013.01); *H04W 72/0453* (2013.01); *H04W 74/0808* (2013.01); *H04L 5/001* (2013.01); *H04W 16/14* (2013.01)

(56) References Cited

U.S. PATENT DOCUMENTS

| | | | | |
|---|---|---|---|---|
| 2013/0128823 A1* | 5/2013 | Turtinen | | H04W 56/0015 |
| | | | | 370/329 |
| 2013/0182688 A1* | 7/2013 | Damnjanovic | | H04L 5/001 |
| | | | | 370/336 |
| 2014/0023022 A1* | 1/2014 | Cheng | | H04L 5/0005 |
| | | | | 370/329 |
| 2014/0036818 A1* | 2/2014 | Koskela | | H04W 72/1231 |
| | | | | 370/329 |
| 2015/0223243 A1* | 8/2015 | Tabet | | H04L 5/001 |
| | | | | 370/330 |
| 2015/0373674 A1* | 12/2015 | Han | | H04W 16/14 |
| | | | | 370/329 |
| 2016/0050004 A1* | 2/2016 | Mallik | | H04B 7/0643 |
| | | | | 370/329 |
| 2016/0050667 A1* | 2/2016 | Papasakellariou | | H04L 1/1822 |
| | | | | 370/329 |
| 2016/0095048 A1* | 3/2016 | Nory | | H04L 27/0006 |
| | | | | 370/252 |
| 2017/0048041 A1* | 2/2017 | Yi | | H04L 5/0048 |
| 2017/0118728 A1* | 4/2017 | Harada | | H04W 52/38 |
| 2017/0195889 A1* | 7/2017 | Takeda | | H04W 72/0446 |

FOREIGN PATENT DOCUMENTS

WO WO 2012/078565 A1 6/2012
WO WO 2013/097144 A1 7/2013

* cited by examiner

TRANSMISSION OF DISCOVERY REFERENCE SIGNALS ON UNLICENSED CARRIER IN A WIRELESS NETWORK

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations, which are referred to as enhanced Node Bs (eNBs), provide wireless access within a coverage area or cell. In LTE, mobile devices, or mobile stations are referred to as user equipments (UE). LTE has included a number of improvements or developments.

SUMMARY

According to an example implementation, a method may include transmitting, by a base station via a component carrier in a licensed band, control information including a resource allocation that identifies time-frequency resources for periodical transmission opportunities to be used for the conditional transmission of discovery reference signals via a secondary component carrier in an unlicensed band, determining, prior to each transmission opportunity, whether the secondary component carrier in the unlicensed band is unoccupied, and transmitting, if the secondary component carrier in the unlicensed band is unoccupied, the discovery reference signals via the secondary component carrier in the unlicensed band using the identified time-frequency resources to one or more user devices.

According to another example implementation, an apparatus may include at least one processor and at least one memory including computer instructions, when executed by the at least one processor, cause the apparatus to: transmit, by a base station via a component carrier in a licensed band, control information including a resource allocation that identifies time-frequency resources for periodical transmission opportunities to be used for the conditional transmission of discovery reference signals via a secondary component carrier in an unlicensed band, determine, prior to each transmission opportunity, whether the secondary component carrier in the unlicensed band is unoccupied, and transmit, if the secondary component carrier in the unlicensed band is unoccupied, the discovery reference signals via the secondary component carrier in the unlicensed band using the identified time-frequency resources to one or more user devices.

According to another example implementation, a computer program product may include a computer-readable storage medium and storing executable code that, when executed by at least one data processing apparatus, is configured to cause the at least one data processing apparatus to perform a method including: transmitting, by a base station via a component carrier in a licensed band, control information including a resource allocation that identifies time-frequency resources for periodical transmission opportunities to be used for the conditional transmission of discovery reference signals via a secondary component carrier in an unlicensed band, determining, prior to each transmission opportunity, whether the secondary component carrier in the unlicensed band is unoccupied, and transmitting, if the secondary component carrier in the unlicensed band is unoccupied, the discovery reference signals via the secondary component carrier in the unlicensed band using the identified time-frequency resources to one or more user devices.

According to another example implementation, a method may include transmitting, via a component carrier in a licensed band, control information including a resource allocation that identifies time-frequency resources for periodical transmission opportunities to be used for the conditional transmission of discovery reference signals via a secondary component carrier in an unlicensed band; determining, prior to a first transmission opportunity of the periodical transmission opportunities, that the secondary component carrier in the unlicensed band is unoccupied; and transmitting, in response to the determining, the discovery reference signals via the secondary component carrier in the unlicensed band using the identified time-frequency resources to one or more user devices.

According to another example implementation, a method may include determining that a secondary component carrier in an unlicensed band is unoccupied; transmitting, via a component carrier in a licensed band in response to the determining that the secondary component carrier is unoccupied, control information that identifies resources for the transmission of discovery reference signals via the secondary component carrier in the unlicensed band; and transmitting the discovery reference signals via the secondary component carrier using the identified resources to one or more user devices.

According to another example implementation, a method may include determining whether it is required to first determine that a secondary component carrier in an unlicensed band is unoccupied before transmission of discovery reference signals via the secondary component carrier in the unlicensed band; performing the following if it is required to first determine that the component carrier in the unlicensed band is unoccupied before the transmission of discovery reference signals via the component carrier in the unlicensed band: determining whether the component carrier in the unlicensed band is unoccupied; and transmitting, if the component carrier in the unlicensed band is unoccupied, the discovery reference signals via the secondary component carrier in the unlicensed band; and performing the following if it is not required to first determine that the component carrier in the unlicensed band is unoccupied before the transmission of discovery reference signals via the component carrier in the unlicensed band: transmitting discovery reference signals on a short control signal (SCS) via the secondary component carrier in the unlicensed band without first determining whether the secondary component carrier in the unlicensed band is unoccupied.

According to another example implementation, a method may include receiving, by a user device from a base station via a component carrier in a licensed band, control information including a resource allocation that identifies time-frequency resources for periodical transmission opportunities to be used by a base station for the conditional transmission of discovery reference signals via a secondary component carrier in an unlicensed band; determining, for each transmission opportunity, whether the discovery reference signals were transmitted via the secondary component carrier using the identified time-frequency resources; and performing, by the user device, synchronization measurements, or cell discovery using the said discovery reference signals.

The details of one or more examples of implementations are set forth in the accompanying drawings and the description below. Other features will be apparent from the description and drawings, and from the claims.

DETAILED DESCRIPTION

Figure 1:
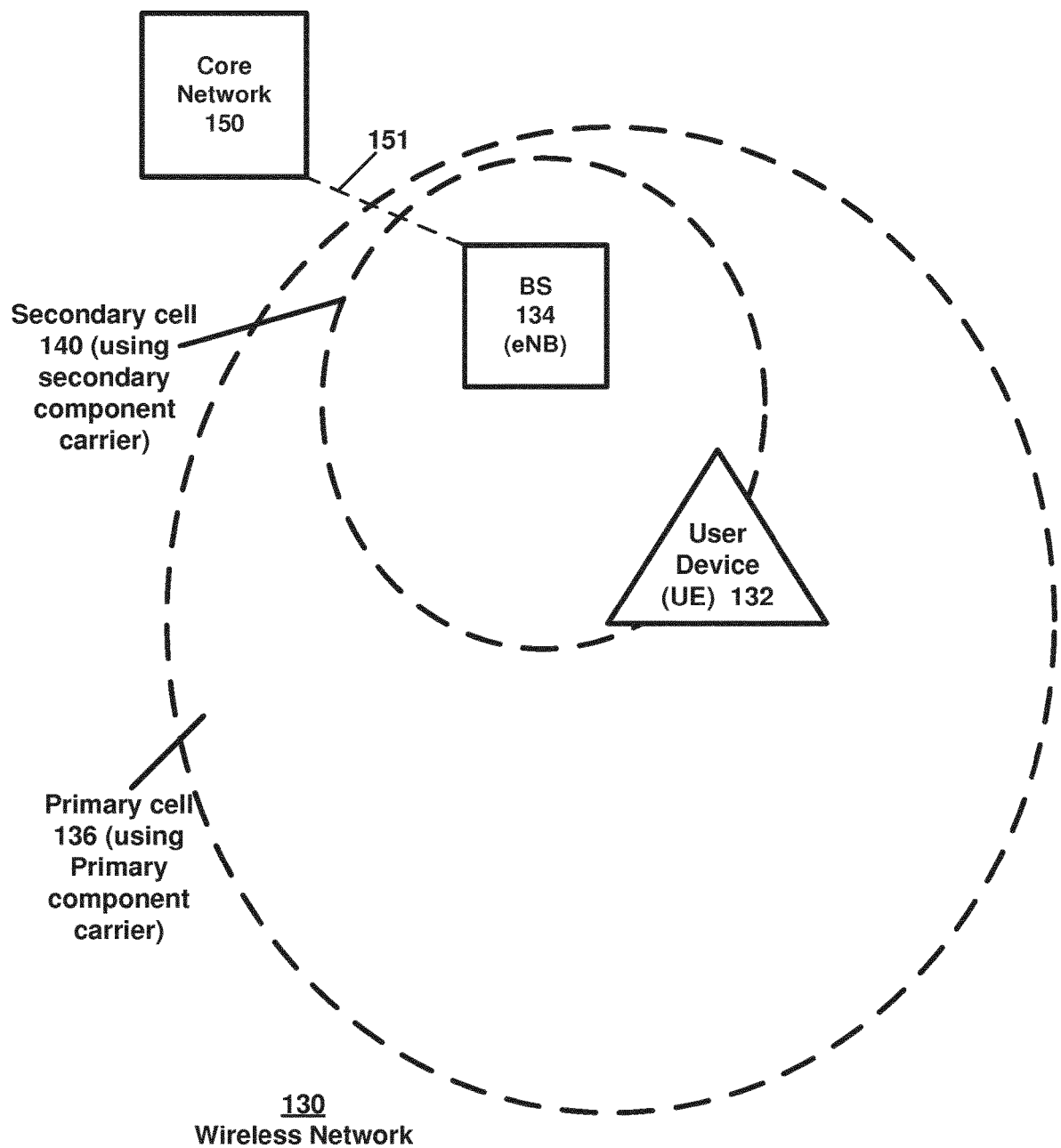
FIG. 1 is a block diagram of a wireless network according to an example implementation.

FIG. 1 is a block diagram of a wireless network 130 according to an example implementation. In the wireless network 130 of FIG. 1, a user device 132, which may also be referred to as a mobile station (MS) or a user equipment (UE), may be connected (and in communication) with one or more base stations (BSs), which may also be referred to as enhanced Node Bs (eNBs), such as BS 134. The BS 134 may provide wireless coverage within multiple cells, such as a primary cell 136 and a secondary cell 140.

According to an example implementation, the user device 132 may communicate using carrier aggregation in which the user device 132 may transmit signals to or receive signals from BS 134 via multiple carriers. FIG. 1 illustrates an example of intra-BS (or intra-eNB) carrier aggregation in which user device 132 is in communication with BS 134 via a primary cell 136 using a primary component carrier and is in communication with BS 134 via secondary cell 140 using a secondary component carrier. Carrier aggregation, where multiple carriers may be aggregated for a user device, may allow data to be transmitted to/from the same user device, thereby allowing increased bitrate or higher bandwidth, and/or allow some of the traffic load to/from the user device to be shifted from a primary cell to a secondary cell, for example. In carrier aggregation, each aggregated carrier may be referred to as a component carrier. While FIG. 1 illustrates an example of intra-BS carrier aggregation, inter-BS (or inter-eNB) carrier aggregation may be provided as well in which a primary cell (via a primary component carrier) and a secondary cell (via a secondary component carrier) may be provided by a primary BS and a secondary BS being at potentially different locations, respectively. This is merely one simple example of a wireless network, and others may be used.

According to an example implementation, a user device (user terminal, mobile station, or user equipment (UE)) may refer to a portable computing device that includes wireless mobile communication devices operating with or without a subscriber identification module (SIM), including, but not limited to, the following types of devices: a mobile station, a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In most cases, LTE networks provide wireless services over licensed bands/spectrum. A licensed band may include, for example, where a government (or government entity) has licensed (or permitted) an operator or group of operators to transmit wireless signals or provide wireless services over the licensed band/spectrum. However, in some cases, wireless operators may also use one or more unlicensed bands, such as to provide additional bandwidth. An example unlicensed frequency band may include the 5 GHz industrial, scientific and medical (ISM) band, which may be shared by a number of different wireless technologies, such as LTE-U (LTE-unlicensed), Wireless Local Area Network (WLAN) or Wi-Fi, etc. According to an example implementation, some wireless systems, such as LTE systems, may use both licensed bands and unlicensed bands to provide wireless services. An example may include LTE License Assisted Access to unlicensed spectrum/bands, which may be referred to as LTE LAA (LTE License Assisted Access).

According to an example implementation, unnecessary transmissions on unlicensed carriers or unlicensed bands should be avoided and/or minimized to avoid interfering with other devices or wireless systems that are also using/sharing the unlicensed band. In an illustrative example implementation, in order to comply with certain regulatory requirements, and also to avoid interfering with other devices on the unlicensed bands, base stations (e.g., eNodeBs) and user devices (e.g., UEs) transmitting on a carrier in an unlicensed band (or an unlicensed carrier) may need to monitor the unlicensed carrier to determine that the unlicensed carrier is not occupied (e.g., to confirm that another wireless device is not transmitting on the unlicensed carrier), before transmitting over the unlicensed carrier. This requirement to confirm that a device first confirm that a carrier in an unlicensed band is unoccupied before transmitting may be referred to as performing a Listen-Before-Talk (LBT) procedure or a Clear-Channel-Access (CCA) procedure, which may involve detecting and measuring an energy level on a carrier, and then comparing the measured energy level to a threshold. For example, the carrier may be considered to be unoccupied if the measured energy on the unlicensed carrier is less than a threshold. Likewise, the carrier may be considered to be occupied if the measured energy on the carrier is greater than a threshold.

For example, in order to comply with certain regulatory requirements, at least in some cases, a BS or user device transmitting on a carrier in an unlicensed band may be required to perform Listen-Before-Talk (LBT) or Clear- Channel-Assessment (CCA) to confirm the carrier is unoccupied, before transmitting on the carrier in the unlicensed band. According to an example implementation, if the carrier in the unlicensed band is occupied, the wireless device (e.g., BS or user device) must typically not start transmission over the carrier in the unlicensed band, e.g., to avoid interfering with other devices.

Some countries, such as Japan, may require a LBT/CCA procedure to be performed on carriers in an unlicensed band before transmitting any signals over the carrier on the unlicensed band. While some other countries may allow some control signals to be transmitted via a short control signals (SCS) without first performing LBT/CCA, such as European countries based on ETSI regulations. In both cases, it may be useful to provide transmission procedures that allow for the transmission of signals, such as discovery reference signals, using the LBT/CCA procedures (e.g., determining if an unlicensed carrier is unoccupied) before transmitting on the carrier in the unlicensed band.

There are a number of discovery reference signals that may typically need to be transmitted by a base station or cell to one or more user devices to allow a user device to synchronize to a cell, to determine identification information for a cell, measure one or more signals from a cell, or perform other functions that may be necessary to communicate with a cell. For example, according to an example implementation, before being able to operate on a cell, a user device may need to first synchronize to the cell based on some predefined signals, i.e. reference signals required for synchronization, denoted here as S-RS. In the LTE Releases 8-11, the initial cell search relies on synchronization signals, such as primary synchronization signal (PSS) and secondary synchronization signals (SSS) as well as cell specific reference signals (CRS), which may be transmitted periodically or from time to time. The synchronization signals and cell reference signals (or cell specific reference signals) are examples of S-RS or discovery reference signals, and other types of discovery reference signals may be transmitted by a cell or base station to one or more user devices. The terms "discovery reference signals" and "reference signals required for synchronization (S-RS)" are used interchangeably herein. For example, an illustrative cell discovery process may include one or more operations or steps, such as, for example, the following two steps:

Step 1: Acquiring synchronization and physical cell identification (PCI): For example, in LTE, based on PSS/SSS signals, the user device may first acquire time and frequency synchronization. The PSS/SSS may also allow the user device to determine the PCI of the measured cell, e.g., for example, there may be a one-to one mapping between PCI and a pair of PSS and SSS sequences.

Step 2: Measuring reference signal received power/reference signal received quality (RSRP/RSRQ) of the cell. Each cell may transmit reference signals which may be received and measured by user devices, e.g., received power and/or received quality (e.g., signal to noise ratio, bit error rate, packet error rate . . . ) of the reference signals. In the current LTE releases, from the PCI, a user device may determine the transmitted CRS (Cell specific Reference Signal or Common Reference Signal) ports and their time/frequency locations. The CRS signals may allow a user device to perform radio resource measurement (RRM) of the received reference signals received from a cell, e.g., to allow a user device to determine RSRP/RSRQ for a cell. After this step, the cell discovery is complete and the user device or UE may have the relevant measurement information (e.g., including the discovery reference signals or S-RS) of the cell to be reported to base station, according to an illustrative example implementation. These are merely examples of how some types of discovery reference signals may allow a user device to perform cell synchronization, signal measurement and other functions. Other types of discovery reference signals may be transmitted and used.

A minimum synchronization time requirement (MSTR) may be defined for a user device or for a cell, and may be the minimum amount of time that a base station or a network may assume that a user device remains synchronized with a cell after receiving discovery reference signals and/or becoming initially synchronized with a cell. For example, if discovery information is conditionally transmitted by a cell via a carrier on a unlicensed band every 4 subframes, e.g., every 4 ms, e.g., assuming that the licensed carrier is unoccupied or clear based on e.g. successful listen before talk (e.g., unlicensed carrier determined to be unoccupied). Thus, in an example implementation, a proposed or intended transmission of discovery reference signals via a carrier on an unlicensed band may be suspended (not performed) if the unlicensed carrier is occupied for any of these scheduled transmissions. In an illustrative example, discovery reference signals may be conditionally transmitted over a carrier on an unlicensed band (assuming the unlicensed carrier is not occupied), for example every 4 ms. A cell may define a MSTR of 20 ms, which means that a user device may maintain synchronization to the cell/unlicensed carrier if the user device receives the discovery reference signals at least every 20 ms, or every fifth discovery reference signal transmission (at a minimum), for example.

According to an example implementation, carrier aggregation may be used to allow a cell to provide wireless services to a user device via two or more carriers or carrier components. In one illustrative example, a first component carrier in a licensed band and a second component carrier in an unlicensed band may be used to provide wireless services from a BS to one or more user devices. In an illustrative example, a primary component carrier provided by a primary cell may be in a licensed band, and a secondary component carrier provided by a secondary cell may be in an unlicensed band. For example, one or more signals transmitted via the primary component carrier may be used to assist operation of services or use of signals provided via the secondary component carrier in an unlicensed band. Alternatively, multiple secondary cells/secondary component carriers may be used, e.g., including a first secondary component carrier in a licensed band and a second secondary component carrier in an unlicensed band.

In one illustrative example, carriers in a licensed band may not typically require a LBT/CCA (or determining that the carrier is unoccupied) procedure to be performed before transmitting on the licensed carrier. Whereas, at least for some situations (e.g., Japan), regulatory requirements may require wireless devices (e.g., user devices or BSs) to perform LBT/CCA/carrier sense procedures before transmitting on a carrier in an unlicensed band (unlicensed carrier).

One example implementation will be briefly described that may use a Short Control Signal (SCS) to transmit discovery reference signals (or S-RS) over an unlicensed carrier without first performing LBT/CCA/carrier sense procedure. ETSI Standard EN 301 893 defines that all equipment operating on unlicensed carriers are required/mandated to perform LBT/CCA procedure before transmitting on the unlicensed carrier. There is one notable exception though: Short Control Signal (SCS) transmissions are not subject to CCA. That is, for example, a SCS can be transmitted over an unlicensed carrier regardless of whether the unlicensed carrier is determined to be unoccupied or not.

ETSI Standard EN 301 893 defines a Short Control Signal (SCS) Transmissions as follows: Short Control Signalling Transmissions are transmissions used by Adaptive equipment to send management and control frames (e.g., ACK/NACK signals) without sensing the channel for the presence of other signals. NOTE: It is not required for adaptive equipment to implement Short Control Signalling Transmissions. Limits: If implemented, Short Control Signalling Transmissions of Adaptive equipment shall have a maximum duty cycle of 5% within an observation period of 50 ms.

Therefore, according to one example implementation, SCS may be used by a base station to transmit discovery reference signals (or S-RS) to one or more user devices via an unlicensed carrier, e.g., without first determining whether or not the unlicensed carrier is unoccupied. In this manner, the use of SCS signals to transmit discovery reference signals over carriers in unlicensed bands (unlicensed carriers) may facilitate cell search, RRM (radio resource management) measurements and user device synchronization to a cell that transmits via an unlicensed carrier.

As discussed above, SCS framework provides a way to guarantee regular transmission of signals necessary for cell search, time frequency synchronization and tracking as well as RRM measurements (e.g., since there is no need to wait for unoccupied carrier before transmitting). However, according to one illustrative example, Japanese regulatory requirements do not recognize/permit LBT-exempt transmission such as SCS, but instead, all transmissions are subject to LBT/CCA/Carrier Sense in Japan (or according to Japanese regulatory requirements). Therefore, using SCS to transmit discovery reference signals (S-RS) to maintain the user device synchronized to the network (as discussed in the previous section) can be applied in all regions world-wide except in Japan. Some additional example implementations will now be briefly described for supporting transmission of discovery reference signals (or S-RS) in situations or countries where LBT/CCA/carrier sense may be required for all signal transmissions, such as in Japan.

Figure 2:
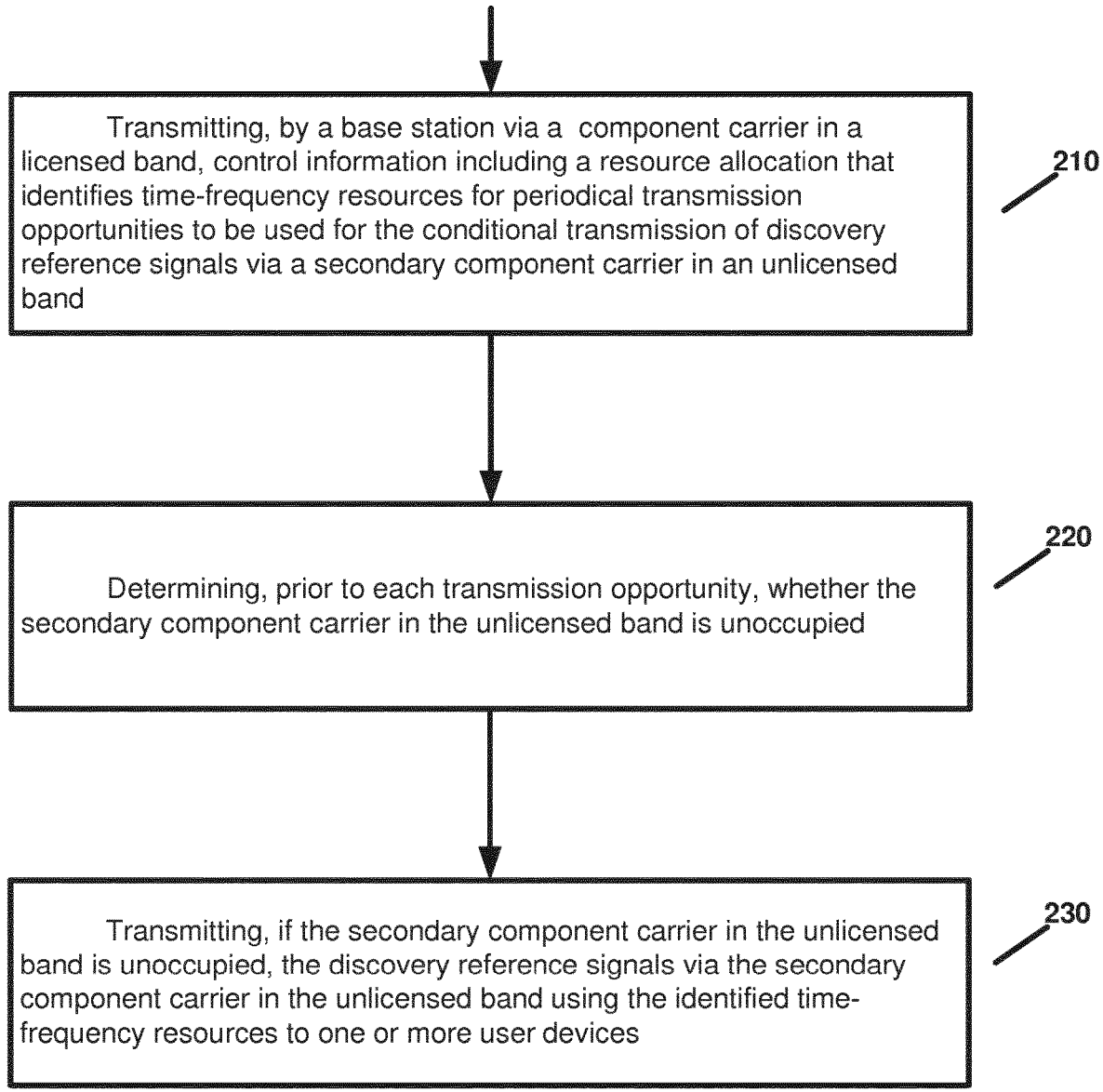
FIG. 2 is a flow chart illustrating operation of a base station according to an example implementation.

1) Opportunistic Periodic Transmission of Discovery Reference Signals:

(See also FIG. 2 for an example of this technique). The base station (or eNodeB) may configure periodic transmission opportunities for discovery reference signals via the primary cell (PCell) or primary component carrier for the user device, similarly as in the case SCS transmission. However, each discovery reference signal transmission is subject to LBT/CCA/Carrier Sense, and in case the channel/unlicensed carrier is determined to be occupied, the transmission of discovery reference signals (as well as any other transmissions) needs to be suspended or omitted. In order to avoid erroneous measurements when the BS/eNodeB is unable to transmit discovery reference signals due to a channel or unlicensed carrier being occupied, the user device/UE may detect the presence/absence of discovery reference signals blindly (e.g., using discontinuous transmission detection, or DTX detection) or alternatively obtaining an indication, e.g., via the PCell/primary cell/primary component carrier on a licensed band, as to the success of LBT/CCA/carrier sense. For example, the BS may transmit, via the primary component carrier on the licensed band, a carrier sense result indication that indicates whether or not the secondary component carrier on an unlicensed band was determined to be unoccupied. Also, such a carrier sense result indication may also indicate whether the discovery reference signals have been or will be transmitted at the periodic transmission opportunity/or at the scheduled resources on the secondary component carrier/secondary cell (SCell) on the unlicensed band. The user device may use the carrier sense result indication to determine whether to process any signals/data received during the transmission opportunity or periodic resources allocated for the transmission of the discovery reference signals on the secondary component carrier on the unlicensed band.

If a periodicity of transmission opportunities for transmission of discovery reference signals via an unlicensed carrier is sufficiently more frequent than the minimum time that the user device may stay synchronized (e.g., the MSTR), and the BS/eNodeB observes a free/unoccupied unlicensed carrier (or channel) reasonably often, the user device can be considered to be sufficiently synchronized (or may be expected to remain synchronized with the cell that uses the unlicensed carrier) in order to enable or maintain reliable LAA (unlicensed carrier) operation. Taking an example from Japanese regulations as an example, the maximum channel occupancy time is limited to 4 ms and therefore LBT/CCA/carrier sense needs to be performed before every transmission. Configuring an opportunistic periodic transmission of discovery reference signals with a 4 ms periodicity for the unlicensed carrier, with MSTR of 20 ms, the user device may maintain synchronization with the secondary cell (SCell) that uses the unlicensed carrier even if the unlicensed carrier is unoccupied (allowing transmission of discovery reference signals via the unlicensed carrier) only one out of 5 consecutive discovery reference signal opportunities. An illustrative example implementation of this technique is described below with reference to the flow chart of FIG. 2.

Figure 3:
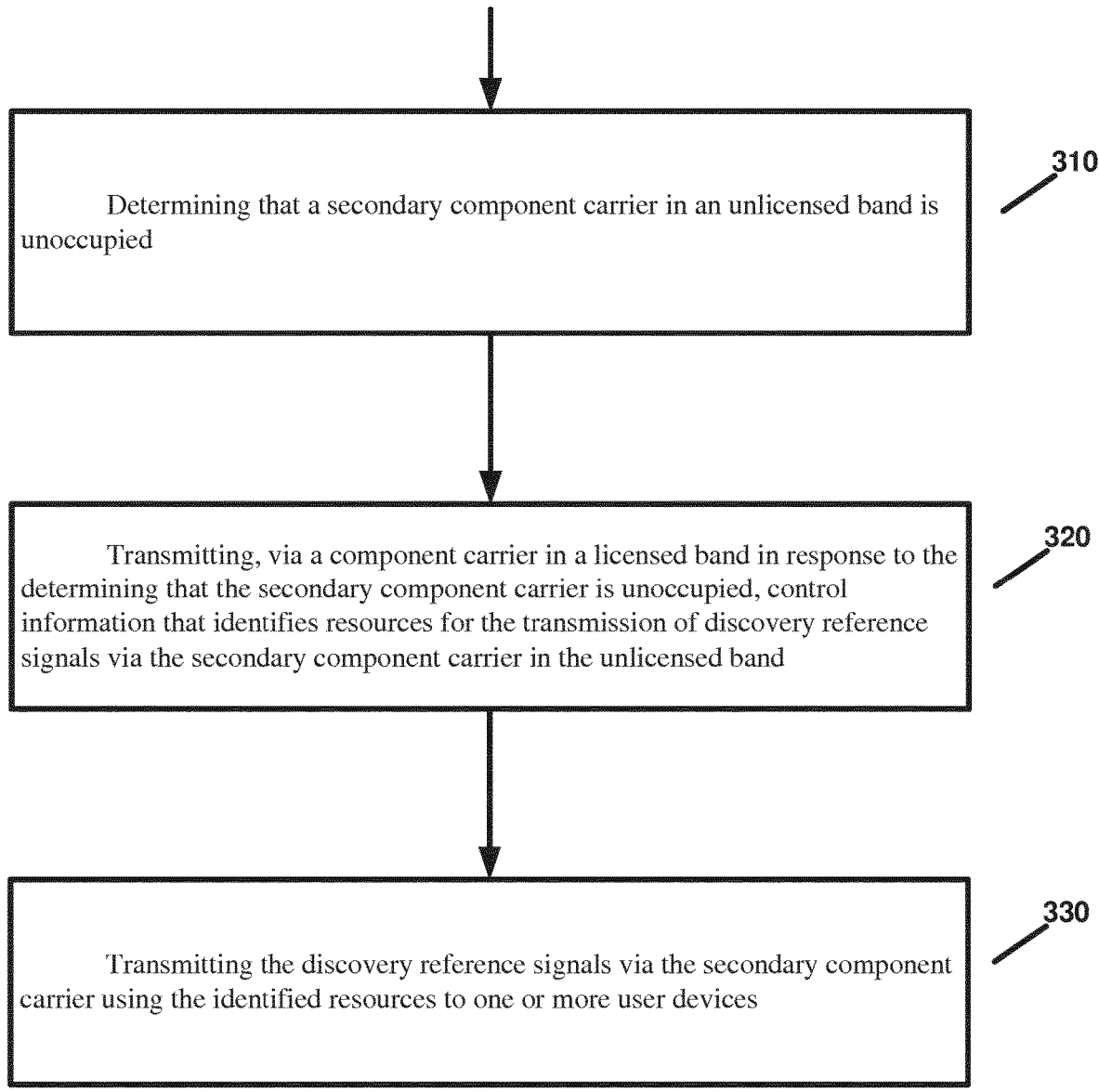
FIG. 3 is a flow chart illustrating operation of a base station according to another example implementation.

2. Aperiodic Scheduled Transmission of Discovery Reference Signals Over Unlicensed Carrier:

(See flow chart of FIG. 3 for an example of this technique). Another alternative is to keep discovery reference signal transmission fully aperiodic and indicate the transmission to the user devices/UEs via PCell (primary cell/primary component carrier) over the licensed band. The drawback of this approach is the increased signaling load on the PCell/primary component carrier on the licensed band. Moreover, the control information for transmission may need to be created or generated for transmission based on LBT/CCA/carrier sense results, e.g., the control information creation for transmission over the PCell/primary component carrier may need to be created relatively fast based on a successful or non-successful LBT/CCA/carrier sense on the secondary component carrier/SCell in unlicensed band. However, option 2, Aperiodic Scheduled transmission of Discovery Reference signals over unlicensed carrier, may especially be an attractive option, for example, in the case of initial synchronization where transmission of more than a single discovery reference signal burst via unlicensed carrier within a single channel occupancy may be considered, e.g., because this technique allows transmission of discovery reference signals over unlicensed carrier whenever an unoccupied unlicensed carrier has been detected, for example. FIG. 3 is a flow chart that illustrates an example of this technique.

The two above solutions 1) and 2), may also be seen as complementary: e.g., as long as the user device is synchronized, option 1)—opportunistic periodic transmission of discovery reference signals may provide a simple/low overhead option, e.g., requiring no dynamic signaling. However, after the user device has lost synchronization, it may be more efficient to use option 2) to indicate to the user device explicitly when it may expect discovery reference signals to be transmitted, e.g., in order to avoid unnecessary user device energy consumption and blind decoding.

FIG. 2 is a block diagram illustrating operation of a base station according to an example implementation of option 1. Operation 210 may include transmitting, by a base station via a component carrier in a licensed band, control information including a resource allocation that identifies time-frequency resources for periodical transmission opportunities to be used for the conditional transmission of discovery reference signals via a secondary component carrier in an unlicensed band. Operation 220 may include determining, prior to each transmission opportunity, whether the secondary component carrier in the unlicensed band is unoccupied. And, operation 230 may include transmitting, if the secondary component carrier in the unlicensed band is unoccupied, the discovery reference signals via the secondary component carrier in the unlicensed band using the identified time-frequency resources to one or more user devices.

According to an example implementation of the method illustrated in FIG. 2, the method may include: transmitting, via a primary component carrier in a licensed band, control information including a resource allocation that identifies time-frequency resources for periodical transmission opportunities to be used for the conditional transmission of discovery reference signals via a secondary component carrier in an unlicensed band; determining, prior to each transmission opportunity, whether the secondary component carrier in the unlicensed band is unoccupied; and transmitting, if the secondary component carrier is unoccupied, the discovery reference signals via the secondary component carrier using the identified time-frequency resources to one or more user devices.

According to an example implementation of the method illustrated in FIG. 2, the component carrier in the licensed band may include one of the following: a primary component carrier in the licensed band; and a secondary component carrier in the licensed band.

According to an example implementation of the method illustrated in FIG. 2, the method may further include transmitting, via the component carrier in the licensed band, a carrier occupation result indication that indicates whether or not the secondary component carrier in the unlicensed band was determined to be unoccupied.

According to an example implementation of the method illustrated in FIG. 2, the method may further include transmitting, via the component carrier in the licensed band, a discovery reference signal transmission indication that indicates, based on the determining, whether the discovery reference signals have been or will be transmitted via the secondary component carrier in the unlicensed band.

According to an example implementation of the method illustrated in FIG. 2, the method may further include transmitting a control signal to one or more user devices to identify a minimum synchronization time that indicates a minimum amount of time a user device is assumed to remain synchronized with a secondary cell that communicates via the secondary carrier in the unlicensed band after the user device receives the discovery reference signals via the secondary component carrier in the unlicensed band.

According to an example implementation of the method illustrated in FIG. 2, the method may further include determining, by a base station associated with a cell that communicates via the carrier in the unlicensed band, a minimum synchronization time that identifies a minimum amount of time a user device is assumed to remain synchronized with a secondary cell after the user device receives the discovery reference signals via the secondary component carrier in the unlicensed band.

According to an example implementation of the method illustrated in FIG. 2, the method may further include determining, by a base station associated with a secondary cell that communicates via the secondary carrier in the unlicensed band, the synchronization status of one or more user devices based on one or more of the following: a minimum synchronization time; carrier occupation of the secondary carrier in the unlicensed band; a discovery reference signal transmission indication that indicates that discovery reference signals were or will be transmitted via the secondary carrier in the unlicensed band; and time instances when discovery reference signals were transmitted via the secondary carrier in the unlicensed band. According to an example implementation of the method illustrated in FIG. 2, the discovery reference signals may include one or more of the following: cell specific reference signals (CRS); channel state information reference signals; synchronization signals; primary synchronization signals (PSS); and secondary synchronization signals (SSS).

According to an example implementation of the method illustrated in FIG. 2, the determining whether the secondary component carrier in the unlicensed band is unoccupied may include performing at least one of the following: detecting an energy level on the secondary component carrier, and determining that the secondary component carrier is unoccupied if the energy level is less than a threshold; detecting a signal specifically transmitted by a certain wireless technology; performing a listen-before-talk (LBT) procedure for the secondary component carrier; and performing a clear channel assessment (CCA) procedure for the secondary component carrier.

According to an example implementation, an apparatus may include at least one processor and at least one memory including computer instructions, when executed by the at least one processor, cause the apparatus to: transmit, by a base station via a component carrier in a licensed band, control information including a resource allocation that identifies time-frequency resources for periodical transmission opportunities to be used for the conditional transmission of discovery reference signals via a secondary component carrier in an unlicensed band; determine, prior to each transmission opportunity, whether the secondary component carrier in the unlicensed band is unoccupied; and transmit, if the secondary component carrier in the unlicensed band is unoccupied, the discovery reference signals via the secondary component carrier in the unlicensed band using the identified time-frequency resources to one or more user devices.

According to another example implementation, a computer program product may include a computer-readable storage medium and storing executable code that, when executed by at least one data processing apparatus, is configured to cause the at least one data processing apparatus to perform a method including: transmitting, by a base station via a component carrier in a licensed band, control information including a resource allocation that identifies time-frequency resources for periodical transmission opportunities to be used for the conditional transmission of discovery reference signals via a secondary component carrier in an unlicensed band; determining, prior to each transmission opportunity, whether the secondary component carrier in the unlicensed band is unoccupied; and transmitting, if the secondary component carrier in the unlicensed band is unoccupied, the discovery reference signals via the secondary component carrier in the unlicensed band using the identified time-frequency resources to one or more user devices.

According to another example implementation, a method may include: transmitting, via a component carrier in a licensed band, control information including a resource allocation that identifies time-frequency resources for periodical transmission opportunities to be used for the conditional transmission of discovery reference signals via a secondary component carrier in an unlicensed band; determining, prior to a first transmission opportunity of the periodical transmission opportunities, that the secondary component carrier in the unlicensed band is unoccupied; and transmitting, in response to the determining, the discovery reference signals via the secondary component carrier in the unlicensed band using the identified time-frequency resources to one or more user devices.

FIG. 3 is a flow chart illustrating operation of a base station according to an example implementation of option 2. Operation 310 may include determining that a secondary component carrier in an unlicensed band is unoccupied. Operation 320 may include transmitting, via a component carrier in a licensed band in response to the determining that the secondary component carrier is unoccupied, control information that identifies resources for the transmission of discovery reference signals via the secondary component carrier in the unlicensed band. Operation 330 may include transmitting the discovery reference signals via the secondary component carrier using the identified resources to one or more user devices.

According to an example implementation of the method illustrated in FIG. 3, the component carrier in the licensed band may include one of: a primary component carrier in the licensed band, and a second secondary component carrier in the licensed band.

According to another example implementation, the above noted options 1) and/or 2) may be combined with the LBT-free SCS transmission of discovery reference signals, e.g., depending on the situation. For example, a user device and/or a cell/BS may receive a control signal indicating whether or not LBT/CCA/carrier sense is required for all signal transmissions. For example, in Japan, a control signal may be provided to indicate that LBT/CCA/carrier sense is required before all transmissions on a carrier in an unlicensed band, whereas for other countries, the control signal may indicate that LBT/CCA/carrier sense is not required for all signal transmissions over unlicensed carrier (e.g., the control signal may indicate that LBT-free SCS may be used, in such countries). It should also be noted, that certain countries including as an example the United States do not require LBT/CCA/carrier sense by regulation at all and for these countries the same discovery signal operation as with SCS may be used as well (in addition to options 1) and 2) that may use LBT/CCA first before transmitting on unlicensed carrier). For example, options 1) and/or 2), which may perform LBT/CCA/carrier sense first before transmitting discovery reference signals over unlicensed carrier may be selected in Japan (since the LBT-free SCS technique may not be used in Japan, in this example) and/or in any country, for example. On the other hand, the LBT-free SCS technique (or all of these techniques, e.g., options 1) and/or 2) requiring LBT/CCA, and/or LBT-free SCS technique) may be selected in other countries where SCS may be used without LBT/CCA procedure being required for unlicensed carriers. Note, that for countries not requiring LBT/CCA as such by regulation (e.g. in the United States), the same procedure as for SCS can be used to transmit discovery reference signals or S-RS. The flow chart in FIG. 4 illustrates an example of this approach, where a discovery reference signal transmission technique (s) may be selected based on whether or not LBT/CCA is required for all transmissions on unlicensed carriers, and/or based on whether LBT-free SCS may be used for the unlicensed carrier.

Figure 4:
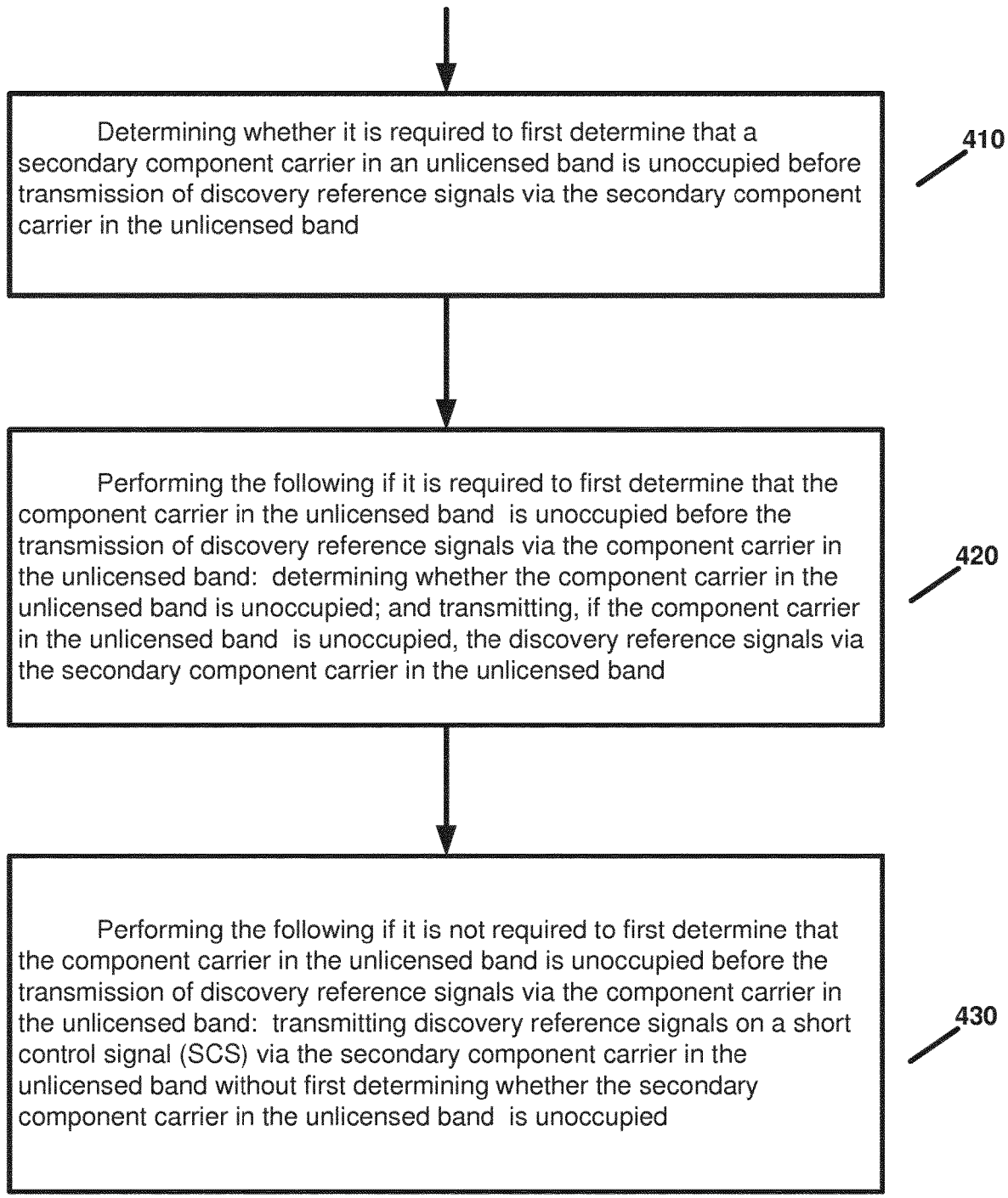
FIG. 4 is a flow chart illustrating operation of a base station according to another example implementation.

FIG. 4 is a flow chart illustrating operation of a base station according to another example implementation. Operation 410 may include determining whether it is required to first determine that a secondary component carrier in an unlicensed band is unoccupied before transmission of discovery reference signals via the secondary component carrier in the unlicensed band. Operation 420 may include performing the following if it is required to first determine that the component carrier in the unlicensed band is unoccupied before the transmission of discovery reference signals via the component carrier in the unlicensed band: determining whether the component carrier in the unlicensed band is unoccupied; and transmitting, if the component carrier in the unlicensed band is unoccupied, the discovery reference signals via the secondary component carrier in the unlicensed band. Operation 430 may include performing the following if it is not required to first determine that the component carrier in the unlicensed band is unoccupied before the transmission of discovery reference signals via the component carrier in the unlicensed band: transmitting discovery reference signals on a short control signal (SCS) via the secondary component carrier in the unlicensed band without first determining whether the secondary component carrier in the unlicensed band is unoccupied.

According to an example implementation, an arrangement is provided for transmission (and/or reception) of different downlink (DL) signals, such as for LTE LAA (LTE Licensed Assisted Access) operation, which may use unlicensed band/spectrum for the transmission of discovery reference signals or S-RS. Some aspects may also include Aperiodic transmission of Short Control Signals (A-SCS), e.g., including discovery reference signals or S-RS, via a carrier in an unlicensed band. A-SCS may be considered a combination of channels/signals facilitation synchronization/tracking/cell search such as PSS/SSS/CRS/CSI-RS etc. A-SCS may additionally include also control information carrier by LTE physical downlink shared (data) channel (e.g., PDSCH or EPDCCH). Furthermore, two strata (or operating states) are defined for BS/eNodeB and user device/UE behavior:

Stratum 1: Synchronous user device/UE operation in a cell

Stratum 2: Asynchronous user device/UE operation in a cell

According to an example implementation, in Stratum 1, or asynchronous operation of a user device/UE, a user device may not maintain accurate time/frequency synchronization with a cell due to absence of dense/frequent enough discovery reference signals, e.g., PSS/SSS/CRS. For example, when a BS is off, the BS does not transmit any signals, which may allow the user device/UE to become unsynchronized with the cell.

According to an example implementation, in Stratum 2, or synchronous operation of a user device/UE, the user device remains synchronized to the cell because the discovery reference signals or S-RS are transmitted frequent (or often) enough, e.g., reference signals used for time/frequency tracking (e.g., CRS) and signals required for synchronization (e.g., PSS/SSS) are transmitted reasonably frequently, e.g., every 5-10 ms, as one example (other time values may be used), to allow the user device/UE to maintain synchronization, e.g., time/frequency tracking and synchronization, with the cell.

The envisioned mode of operation is may be as follows, according to an example implementation.

Transmission opportunities for A-SCS may be predetermined and either fixed in the specification (e.g., every 4 ms) or indicated to the user device/UE via signaling, e.g., via RRC signaling through the licensed band.

In case LBT/CCA procedure indicates that the unlicensed carrier/operating channel is occupied prior to transmission opportunity of A-SCS, the transmission of A-SCS is omitted (dropped), for example.

Alternatively or additionally, the BS/eNodeB may indicate to the user device/UE via L1 signalling (e.g. PCell PDCCH/EPDCCH) that A-SCS is (/was/will be) transmitted. This option may be denoted as Scheduled A-SCS, for example.

Alternatively or additionally, the eNodeB may indicate to the UE via L1 signalling (e.g. PCell PDCCH/EPDCCH) that A-SCS is (/was/will be) transmitted. We denote this option as Scheduled A-SCS.

(Re-)Obtaining synchronization (i.e. moving from Stratum 2 to Stratum 1): Knowing the A-SCS transmission opportunities, the user device/UE determines the presence of A-SCS and (if present) synchronizes to the cell using the discovery reference signals received via A-SCS The UE may perform, e.g., blind detection of (some of the) signals belonging to A-SCS to determine whether A-SCS were transmitted or not Alternatively, the user device/UE may get an indication from the BS/eNodeB via e.g., PCell PDCCH/EPDCCH on primary carrier in licensed band, e.g., indicating that Scheduled A-SCS transmission will take place via unlicensed carrier In one embodiment, the scheduled A-SCS have a different structure than other A-SCS. E.g., the number or the density of reference signals may be higher with Scheduled A-SCS to facilitate more accurate synchronization on a per need basis Maintaining and losing synchronization (i.e. moving from stratum 1 to Stratum 2):

A Minimum Synch Time Requirement (MSTR) may be defined for the user device/UE.

MSTR defines the time duration (i.e., window) during which the user device/UE shall (at least) remain synchronized (i.e., Stratum 1) after a transmission instance of A-SCS (e.g., discovery reference signals via A-SCS)

MSTR may be e.g. in the order of 20 ms, according to one illustrative example

MSTR may be fixed in the specifications or alternatively indicated to the user device/UE via e.g., RRC (radio resource control) signalling After the time corresponding to MSTR has passed since the last A-SCS transmission or last discovery signal transmission, the network no longer expects the user device/UE to be synchronized, i.e., cell/UE falls to Stratum 2 (unsynchronized)

However, the user device/UE may, depending on the implementation, be able to keep the synchronization for a longer time than MSTR requires In one possible embodiment, the UE may indicate to the eNodeB its assumption on the stratum.

This may be done via e.g. PUCCH using a licensed carrier

The signaling may be included in CSI reporting

The UE may e.g. report CQI value "0" (i.e. "out-of-range") in case it has lost synchronization to the cell.

Figure 5:
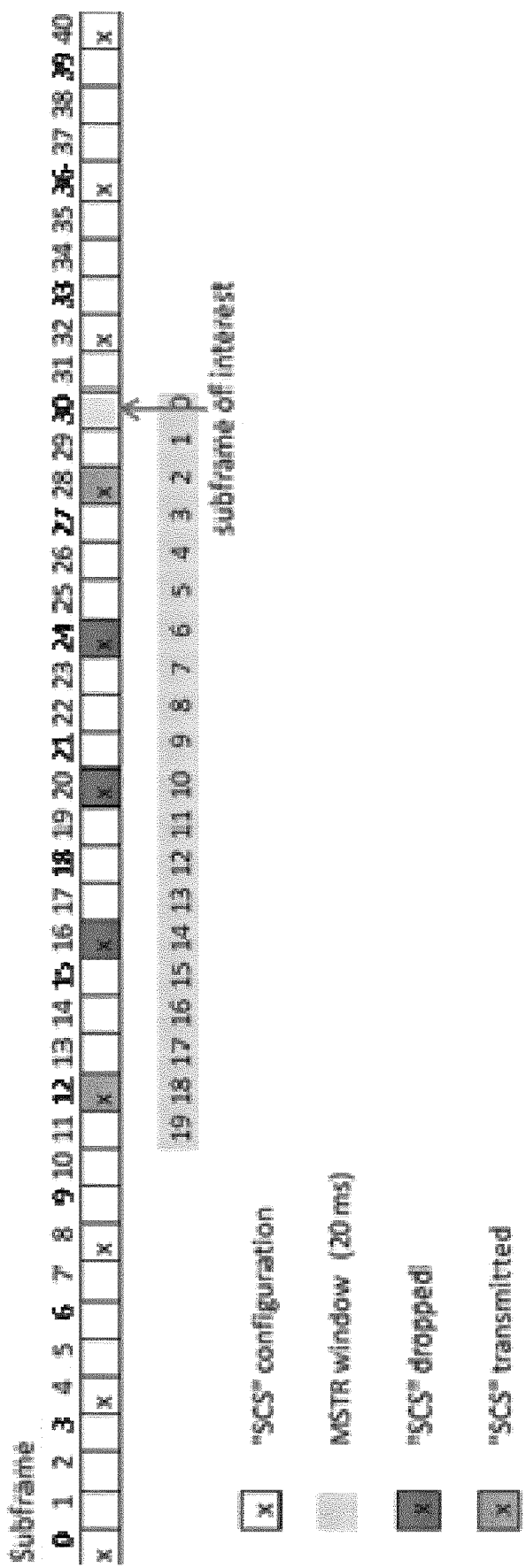
FIG. 5 is a diagram illustrating a minimum synchronization time requirement (MSTR) window according to an example implementation.

Note, according to an example implementation, this A-SCS operation may only be needed in case some regular guaranteed SCS type of transmission cannot be guaranteed, e.g. in Japan. Therefore, depending on the region, the network might configure the UE to either operate with periodic SCS type of operation FIG. 5 is a diagram illustrating a minimum synchronization time requirement (MSTR) window according to an example implementation. A 20 subframe MSTR window is shown, with each subframe being 1 ms, for example. An "x" in each subframe indicates a scheduled/periodic transmission opportunity (TXOP) for A-SCS signals for the transmission of discovery reference signals or S-RS. In this example A-SRS (including discovery reference signals via unlicensed carrier are scheduled for transmission every 4 ms, or every 4 subframes, for example. For example, if the current subframe is subframe 30, then the user device most recently received discovery reference signals via A-SCS at subframe 28 (marked by x). A cell or BS may use a MSTR window for each user device/UE to keep track of which user devices are synchronized, and which user devices/UEs have lost synchronization (or can assume the UE has lost synchronization with the cell, e.g., if A-SCS was more than 20 subframes/20 ms ago, for example). The user device/UE can send data to the cell and receive data from the cell when user device is synchronized with the cell. If the user device loses synchronization, e.g., when more than 20 ms/20 subframes have elapsed since receiving A-SCS or discovery reference signals, then the cell must wait for the user device to re-synchronize with the cell before scheduling and transmitting data to the user device/UE, for example.

There is a certain A-SCS configuration defined (periodicity equals to 4 ms in the current example)

A-SCS is transmitted whenever possible

A-SCS is dropped if transmission is not possible (due to negative LBT and related regulatory rules)

MSTR has been defined. It equals to 20 ms (i.e. 20 subframes) in the current example. Predetermined conditions are defined for determining the stratum, i.e., whether the cell/UE can be considered to be synchronized (e.g. when considering subframe #30 in the example):

The most straightforward option would be to define/determine the stratum according to the number of transmitted A-SCS during the MSTR window E.g., at least one A-SCS needs to be transmitted during the MSTR window for user device/UE to be synchronized with cell Another option would be to define/determine the stratum based on the A-SCS dropping rate This option may not be ideal with Scheduled A-SCS, as the periodicity of the SCS transmission opportunities is not fixed There could be also some "filter" defined, where the most recent SCS transmission is given a large weight when determining the cell synchronization status (i.e. stratum), such as a filter having a forgetting factor.

An Example of this approach is as follows:

Sync(n)=a*A-SCS(n)+b*Sync(n−1)

If Sync(n)>threshold, the cell is considered to be synchronized

A-SCS(n) gets values 0 (dropped) and 1 (transmitted)

a, b, threshold are predefined parameters

The BS/eNB knows the sync (synchronization) status (Stratum) in the cell for each subframe
 If the cell is out-of-sync (i.e., Stratum 1)
  Option #1: BS/eNodeB cannot use the cell (this applies to both DL and UL usage)
  Option #2: Scheduled A-SCS can be triggered for recovering the cell
  Option #3: "Opportunistic usage" is always possible as well. In other words, eNB can take the risk that SCell is not properly synchronized and independently try to serve users.
 Otherwise (in case when the cell is considered to be synchronized), the cell can be used normally (within limitations set by LBT)
Some example illustrative UE operations may include:
A basic option may be that a user device/UE just operates according to configured A-SCS and assumes that it (the discovery reference signals via A-SCS) is always transmitted.
 It may not be necessary for the UE to know the sync status of the cell.
  In the case when the cell is "out-of-sync", then the UE may perform data buffering and (E)PDCCH blind detection unnecessarily
  There can be also some assistance signaling (from BS/eNB to user device/UE) to indicate explicitly the sync status. This can be seen as similar signaling what has been defined for eIMTA (i.e., the signalling can reduce e.g. PDCCH blind detection burden)
  In case the scheduling is performed through licensed bands, the UE would anyhow know if the eNB is transmitting to the user and therefore assumes the cell to be 'in-sync'
Another example option is that the user device/UE tries to determine whether A-SCS were transmitted and operates accordingly.
 The UE determines the sync stratum based on the determination (e.g. according to the number of transmitted A-SCS during the MSTR window) and operates accordingly
  For example, if the user device/UE determines that the cell is "out-of-sync" it may stop using this carrier until synchronization is re-established
 This option may require that the user device/UE fulfills a specific RAN4 requirement defined for the A-SCS blind detection.
Option 3: Regardless of the applied scheme, the user devices/UEs may always be ready to receive Scheduled A-SCS (based on the signaling received from the PCell) to synchronize the cell.
Some example advantages may include:
The solution fulfills the LBT requirements defined by the regulators, including Japan.
A single global solution based on synchronized operation is defined
 a. Synchronization signals can be subject to LBT/Carrier Sense according to local regulatory rules (e.g., in Japan)
 b. Synchronization signals can be transmitted according to rules defined for Short Control Signaling (e.g., in Europe)
 c. Synchronization signals can be transmitted also without any requirement of LBT/Carrier sense (as in current LTE)

The proposed solution facilitates transmission of necessary DL signals
The proposed solution has maximum commonality with current LTE (non-LBT) solutions
The solution scales into different scenarios
The solution can be seen as "mandatory or required, at least in some cases, e.g., to facilitate synchronous user device/UE operation subject to LBT requirements, e.g. for Japan.

Figure 6:
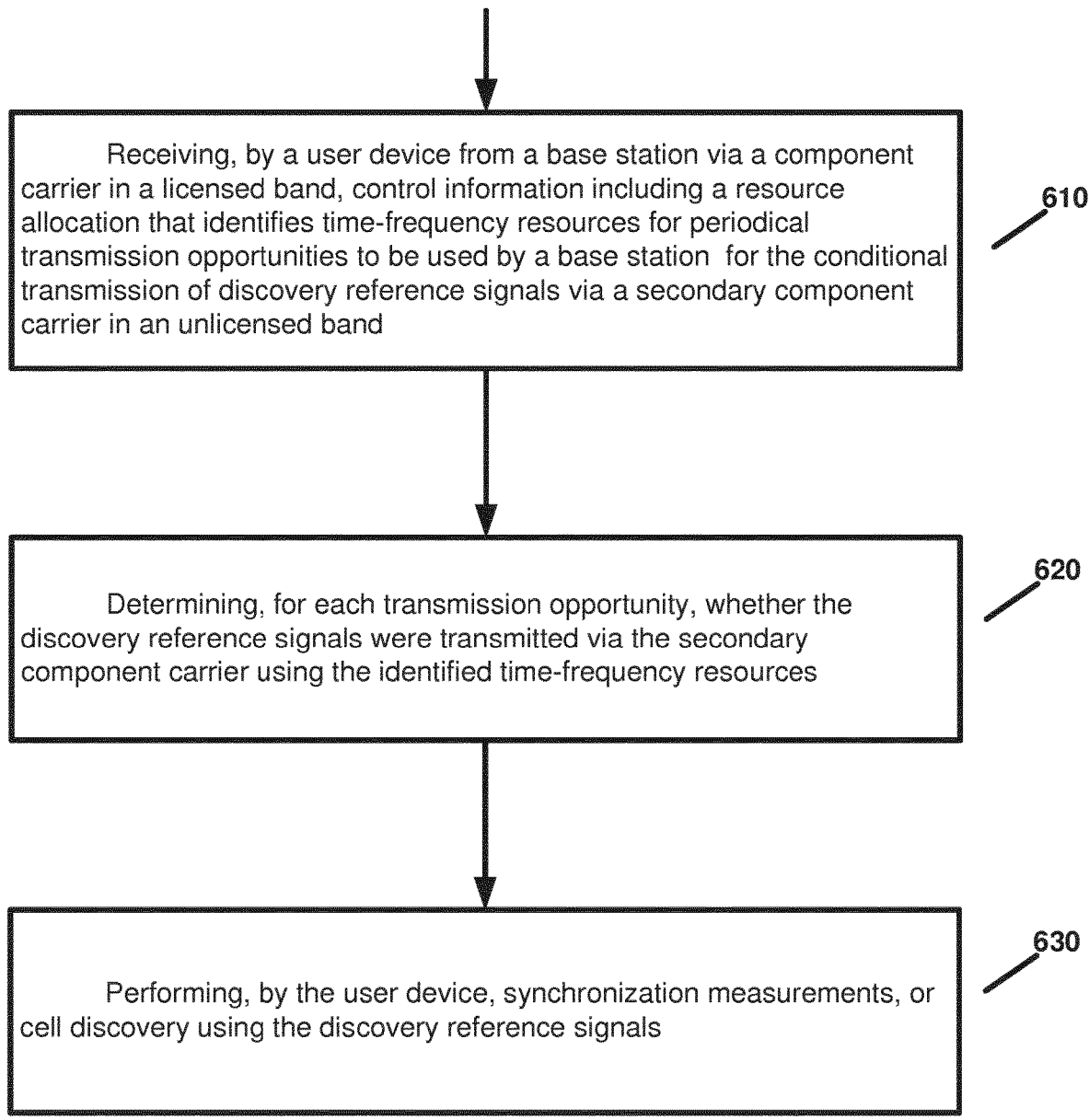
FIG. 6 is a flow chart illustrating operation of a user device according to an example implementation.

FIG. 6 is a flow chart illustration operation of a user device/UE according to an example implementation. Operation 610 may include receiving, by a user device from a base station via a component carrier in a licensed band, control information including a resource allocation that identifies time-frequency resources for periodical transmission opportunities to be used by a base station for the conditional transmission of discovery reference signals via a secondary component carrier in an unlicensed band. Operation 620 may include determining, for each transmission opportunity, whether the discovery reference signals were transmitted via the secondary component carrier using the identified time-frequency resources. Operation 630 may include performing, by the user device, synchronization measurements, or cell discovery using the discovery reference signals.

According to an example implementation of the method of FIG. 6, the method may further include wherein determining whether the discovery reference signals were transmitted may include receiving, via the component carrier in the licensed band, a carrier occupation result indication that indicates whether or not the secondary component carrier was determined to be unoccupied by the base station.

According to an example implementation of the method of FIG. 6, the method may further include wherein the determining whether the discovery reference signals were transmitted comprises receiving, via the component carrier in the licensed band, a discovery reference signal transmission indication that indicates, whether the discovery reference signals have been or will be transmitted via the secondary component carrier.

According to an example implementation of the method of FIG. 6, the method may further include receiving, by a user device from a base station associated with a secondary cell, a control signal to identify a minimum synchronization time for the user device that identifies a minimum amount of time the user device is assumed to remain synchronized with the secondary cell after the user device receives the discovery reference signals via the secondary component carrier.

According to an example implementation of the method of FIG. 6, the discovery reference signals may include one or more of the following: cell specific reference signals (CRS); channel state information reference signals; synchronization signals; primary synchronization signals (PSS); and secondary synchronization signals (SSS).

According to an example implementation of the method of FIG. 6, the method may further include wherein the determining whether the discovery reference signals were transmitted comprises performing energy detection of discovery reference signals.

According to an example implementation of the method of FIG. 6, the method may further include determining, by a user device associated with a secondary cell the synchronization status of one or more user devices based on one or more of the following: a minimum synchronization time; carrier occupation; a discovery reference signal transmission indication; the time instances when discovery reference signals were transmitted; and explicit signaling indicating synchronization status.

According to an example implementation of the method of FIG. 6, the method may further include determining by a user device an expected synchronization status of a base station associated with a secondary cell that communicates via the secondary component carrier in the unlicensed band, the determining an expected synchronization status being performed based on one or more of the following: a minimum synchronization time; carrier occupation; a discovery reference signal transmission indication; the time instances when discovery reference signals were transmitted; and explicit signaling indicating synchronization status.

Figure 7:
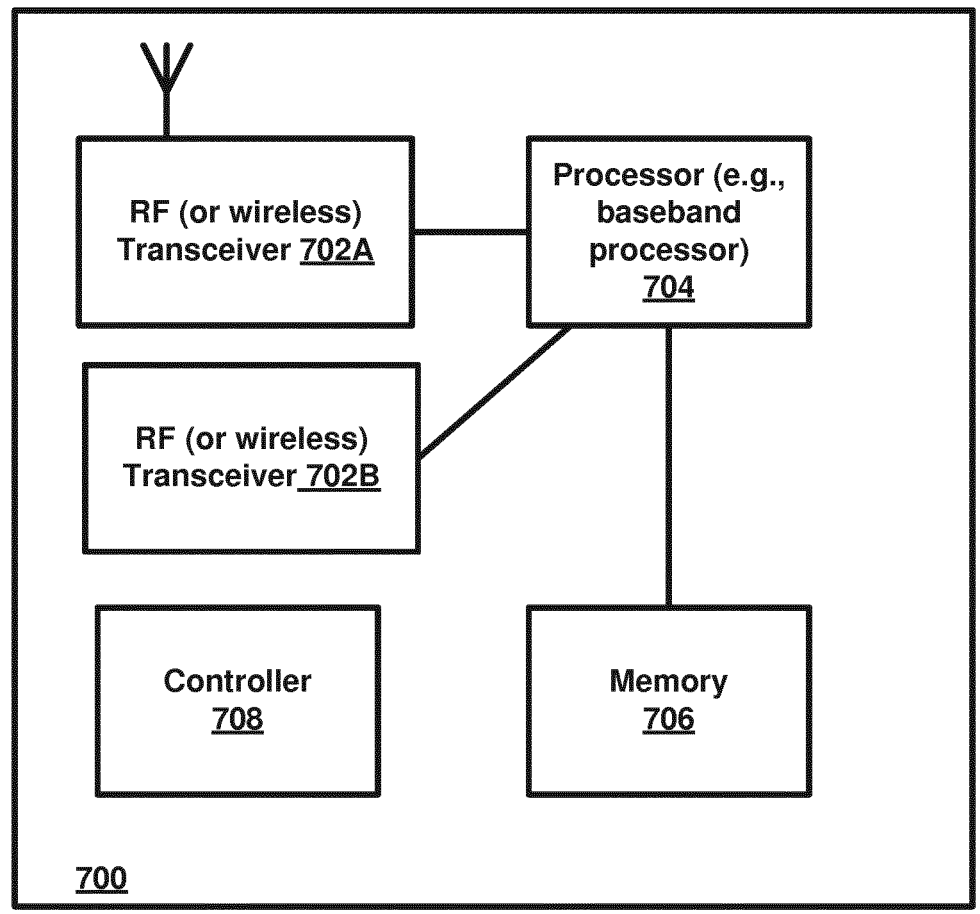
FIG. 7 is a block diagram of a wireless station (e.g., BS or user device) according to an example implementation.

FIG. 7 is a block diagram of a wireless station (e.g., BS or user device) 700 according to an example implementation. The wireless station 700 may include, for example, two RF (radio frequency) or wireless transceivers 702A, 702B, where each wireless transceiver includes a transmitter to transmit signals and a receiver to receive signals. The wireless station also includes a processor or control unit/entity (controller) 704 to execute instructions or software and control transmission and receptions of signals, and a memory 706 to store data and/or instructions.

Processor 704 may also make decisions or determinations, generate frames, packets or messages for transmission, decode received frames or messages for further processing, and other tasks or functions described herein. Processor 704, which may be a baseband processor, for example, may generate messages, packets, frames or other signals for transmission via wireless transceiver 702 (702A or 702B). Processor 704 may control transmission of signals or messages over a wireless network, and may control the reception of signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller (or processor) 708 may execute software and instructions, and may provide overall control for the station 700, and may provide control for other systems not shown in FIG. 7, such as controlling input/output devices (e.g., display, keypad), and/or may execute software for one or more applications that may be provided on wireless station 700, such as, for example, an email program, audio/video applications, a word processor, a Voice over IP application, or other application or software.

In addition, a storage medium may be provided that includes stored instructions, which when executed by a controller or processor may result in the processor 704, or other controller or processor, performing one or more of the functions or tasks described above.

According to another example implementation, RF or wireless transceiver(s) 702A/702B may receive signals or data and/or transmit or send signals or data. Processor 704 (and possibly transceivers 702A/702B) may control the RF or wireless transceiver 702A or 702B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    transmitting, by a base station via a component carrier in a licensed band, control information including a resource allocation that identifies time-frequency resources for periodical transmission opportunities configured to be used for a conditional transmission of discovery reference signals via a secondary component carrier in an unlicensed band;
    determining, by the base station, whether it is required to first determine that the second component carrier in the unlicensed band is unoccupied before transmission of the discovery reference signals via the secondary component carrier in the unlicensed band;
    determining, by the base station, prior to each transmission opportunity and in response to determining that it is required to first determine that the second component carrier in the unlicensed band is unoccupied, whether the secondary component carrier in the unlicensed band is unoccupied;
    transmitting, by the base station, responsive to determining that the secondary component carrier in the unlicensed band is unoccupied, the discovery reference signals via the secondary component carrier in the unlicensed band using the identified time-frequency resources to one or more user devices;
    transmitting, by the base station, via the component carrier in the licensed band responsive to determining whether the second component carrier in the unlicensed band is unoccupied, a carrier occupation result indication that indicates whether or not the secondary component carrier in the unlicensed band was determined to be unoccupied; and
    tracking synchronization of one or more user devices with a secondary cell via transmitting, by the base station, a control signal to the one or more user devices, the control signal comprising a minimum synchronization time window to identify a minimum synchronization time that indicates a minimum amount of time the base station assumes a user device is to remain synchronized with a secondary cell that communicates via the secondary carrier in the unlicensed band after the user device receives the discovery reference signals via the secondary component carrier in the unlicensed band, wherein upon an amount of time after the user device receives the discovery reference signals exceeding the window, the base station ceases to assume that the user device remains synchronized with the secondary cell.

2. The method according to claim 1, wherein the component carrier in the licensed band comprises one of the following:
    a primary component carrier in the licensed band; or a secondary component carrier in the licensed band.

3. The method according to claim 1, further comprising: transmitting, via the component carrier in the licensed band, a discovery reference signal transmission indication that indicates, based on the determining, whether the discovery reference signals have been or will be transmitted via the secondary component carrier in the unlicensed band.

4. The method according to claim 1, further comprising: determining, by a base station associated with a cell that communicates via the carrier in the unlicensed band, the minimum synchronization time that identifies the minimum amount of time the user device is assumed to remain synchronized with the secondary cell after the user device receives the discovery reference signals via the secondary component carrier in the unlicensed band.

5. The method according to claim 1, further comprising: determining, by a base station associated with the secondary cell that communicates via the secondary carrier in the unlicensed band, a synchronization status of the one or more user devices based on one or more of the following:
- the minimum synchronization time;
- carrier occupation of the secondary carrier in the unlicensed band;
- a discovery reference signal transmission indication that indicates that discovery reference signals were or will be transmitted via the secondary carrier in the unlicensed band; or
- one or more time instances during which discovery reference signals were transmitted via the secondary carrier in the unlicensed band.

6. The method according to claim 1, wherein the discovery reference signals comprise one or more of the following:
- cell specific reference signals;
- channel state information reference signals;
- synchronization signals;
- primary synchronization signals; and
- secondary synchronization signals.

7. The method according to claim 1, wherein the determining whether the secondary component carrier in the unlicensed band is unoccupied comprises performing at least one of the following:
- detecting an energy level on the secondary component carrier, and determining that the secondary component carrier is unoccupied responsive to detecting that the energy level is less than a threshold;
- detecting a signal specifically transmitted by a certain wireless technology;
- performing a listen-before-talk procedure for the secondary component carrier; or performing a clear channel assessment procedure for the secondary component carrier.

8. A computer program product, the computer program product comprising a non-transitory computer-readable storage medium and storing executable code that, in response to being executed by at least one data processing apparatus, is configured to cause the at least one data processing apparatus to perform a method of claim 1.

9. The method of claim 1, wherein the control information provides an indication of the time-frequency resources, the indication comprising at least one periodicity of transmission of the discovery reference signals.

10. A method comprising:
transmitting, by a base station via a component carrier in a licensed band, control information including a resource allocation that identifies time-frequency resources for periodical transmission opportunities configured to be used for a conditional transmission of discovery reference signals via a secondary component carrier in an unlicensed band;
determining, by the base station, whether it is required to first determine that the second component carrier in the unlicensed band is unoccupied before transmission of the discovery reference signals via the secondary component carrier in the unlicensed band;
determining, by the base station, prior to a first transmission opportunity of the periodical transmission opportunities and in response to determining that it is required to first determine that the second component carrier in the unlicensed band is unoccupied, that the secondary component carrier in the unlicensed band is unoccupied;
transmitting, by the base station, in response to the determining that the second component carrier in the unlicensed band is unoccupied, the discovery reference signals via the secondary component carrier in the unlicensed band using the identified time-frequency resources to one or more user devices; and
tracking synchronization of one or more user devices with a secondary cell via transmitting, by the base station, a control signal to the one or more user devices, the control signal comprising a minimum synchronization time window to identify a minimum synchronization time that indicates a minimum amount of time the base station assumes a user device is to remain synchronized with a secondary cell that communicates via the secondary carrier in the unlicensed band after the user device receives the discovery reference signals via the secondary component carrier in the unlicensed band, wherein upon an amount of time after the user device receives the discovery reference signals exceeding the window, the base station ceases to assume that the user device remains synchronized with the secondary cell.

11. An apparatus comprising at least one processor and at least one non-transitory memory including computer instructions, in response to being executed by the at least one processor, cause the apparatus to:
transmit, by a base station via a component carrier in a licensed band, control information including a resource allocation that identifies time-frequency resources for periodical transmission opportunities configured to be used for a conditional transmission of discovery reference signals via a secondary component carrier in an unlicensed band;
determine, by the base station, whether it is required to first determine that the second component carrier in the unlicensed band is unoccupied before transmission of the discovery reference signals via the secondary component carrier in the unlicensed band;
determine, by the base station, prior to each transmission opportunity and in response to determining that it is required to first determine that the second component carrier in the unlicensed band is unoccupied, whether the secondary component carrier in the unlicensed band is unoccupied;
transmit, by the base station, responsive to determining that the secondary component carrier in the unlicensed band is unoccupied, the discovery reference signals via the secondary component carrier in the unlicensed band using the identified time-frequency resources to one or more user devices;
transmit, by the base station, via the component carrier in the licensed band responsive to determining whether the second component carrier in the unlicensed band is unoccupied, a carrier occupation result indication that indicates whether or not the secondary component carrier in the unlicensed band was determined to be unoccupied; and
track synchronization of one or more user devices with a secondary cell via transmitting, by the base station, a control signal to the one or more user devices, the control signal comprising a minimum synchronization time window to identify a minimum synchronization time that indicates a minimum amount of time the base station assumes a user device is to remain synchronized with a secondary cell that communicates via the secondary carrier in the unlicensed band after the user device receives the discovery reference signals via the secondary component carrier in the unlicensed band, wherein upon an amount of time after the user device receives the discovery reference signals exceeding the window, the base station ceases to assume that the user device remains synchronized with the secondary cell.

12. The apparatus according to claim 11, wherein the component carrier in the licensed band comprises one of the following:
a primary component carrier in the licensed band; or
a secondary component carrier in the licensed band.

13. The apparatus according to claim 11, wherein the executed instructions further cause the apparatus to:
transmit, via the component carrier in the licensed band, a discovery reference signal transmission indication that indicates, based on the determining, whether the discovery reference signals have been or will be transmitted via the secondary component carrier in the unlicensed band.

14. The apparatus according to claim 11, wherein the executed instructions further cause the apparatus to:
determine, by a base station associated with a cell that communicates via the carrier in the unlicensed band, the minimum synchronization time that identifies the minimum amount of time the user device is assumed to remain synchronized with the secondary cell after the user device receives the discovery reference signals via the secondary component carrier in the unlicensed band.

15. The apparatus according to claim 11, wherein the executed instructions further cause the apparatus to:
determine, by a base station associated with the secondary cell that communicates via the secondary carrier in the unlicensed band, a synchronization status of the one or more user devices based on one or more of the following:
the minimum synchronization time;
carrier occupation of the secondary carrier in the unlicensed band;
a discovery reference signal transmission indication that indicates that discovery reference signals were or will be transmitted via the secondary carrier in the unlicensed band; or
one or more time instances during which discovery reference signals were transmitted via the secondary carrier in the unlicensed band.

16. The apparatus according to claim 11, wherein the discovery reference signals comprise one or more of the following:
cell specific reference signals;
channel state information reference signals;
synchronization signals;
primary synchronization signals; and
secondary synchronization signals.

17. The apparatus according to claim 11, wherein the determining whether the secondary component carrier in the unlicensed band is unoccupied comprises performing at least one of the following:
detecting an energy level on the secondary component carrier, and determining that the secondary component carrier is unoccupied responsive to detecting that the energy level is less than a threshold;
detecting a signal specifically transmitted by a certain wireless technology;
performing a listen-before-talk procedure for the secondary component carrier; or performing a clear channel assessment procedure for the secondary component carrier.

18. An apparatus comprising at least one processor and at least one non-transitory memory including computer instructions, in response to being executed by the at least one processor, cause the apparatus to:
transmit, by a base station via a component carrier in a licensed band, control information including a resource allocation that identifies time-frequency resources for periodical transmission opportunities configured to be used for a conditional transmission of discovery reference signals via a secondary component carrier in an unlicensed band;
determine, by the base station, whether it is required to first determine that the second component carrier in the unlicensed band is unoccupied before transmission of the discovery reference signals via the secondary component carrier in the unlicensed band;
determine, by the base station, prior to a first transmission opportunity of the periodical transmission opportunities and in response to determining that it is required to first determine that the second component carrier in the unlicensed band is unoccupied, that the secondary component carrier in the unlicensed band is unoccupied;
transmit, by the base station, in response to the determining that the second component carrier in the unlicensed band is unoccupied, the discovery reference signals via the secondary component carrier in the unlicensed band using the identified time-frequency resources to one or more user devices; and
track synchronization of one or more user devices with a secondary cell via transmitting, by the base station, a control signal to the one or more user devices, the control signal comprising a minimum synchronization time window to identify a minimum synchronization time that indicates a minimum amount of time the base station assumes a user device is to remain synchronized with a secondary cell that communicates via the secondary carrier in the unlicensed band after the user device receives the discovery reference signals via the secondary component carrier in the unlicensed band, wherein upon an amount of time after the user device receives the discovery reference signals exceeding the window, the base station ceases to assume that the user device remains synchronized with the secondary cell.

* * * * *